UNITED STATES PATENT OFFICE.

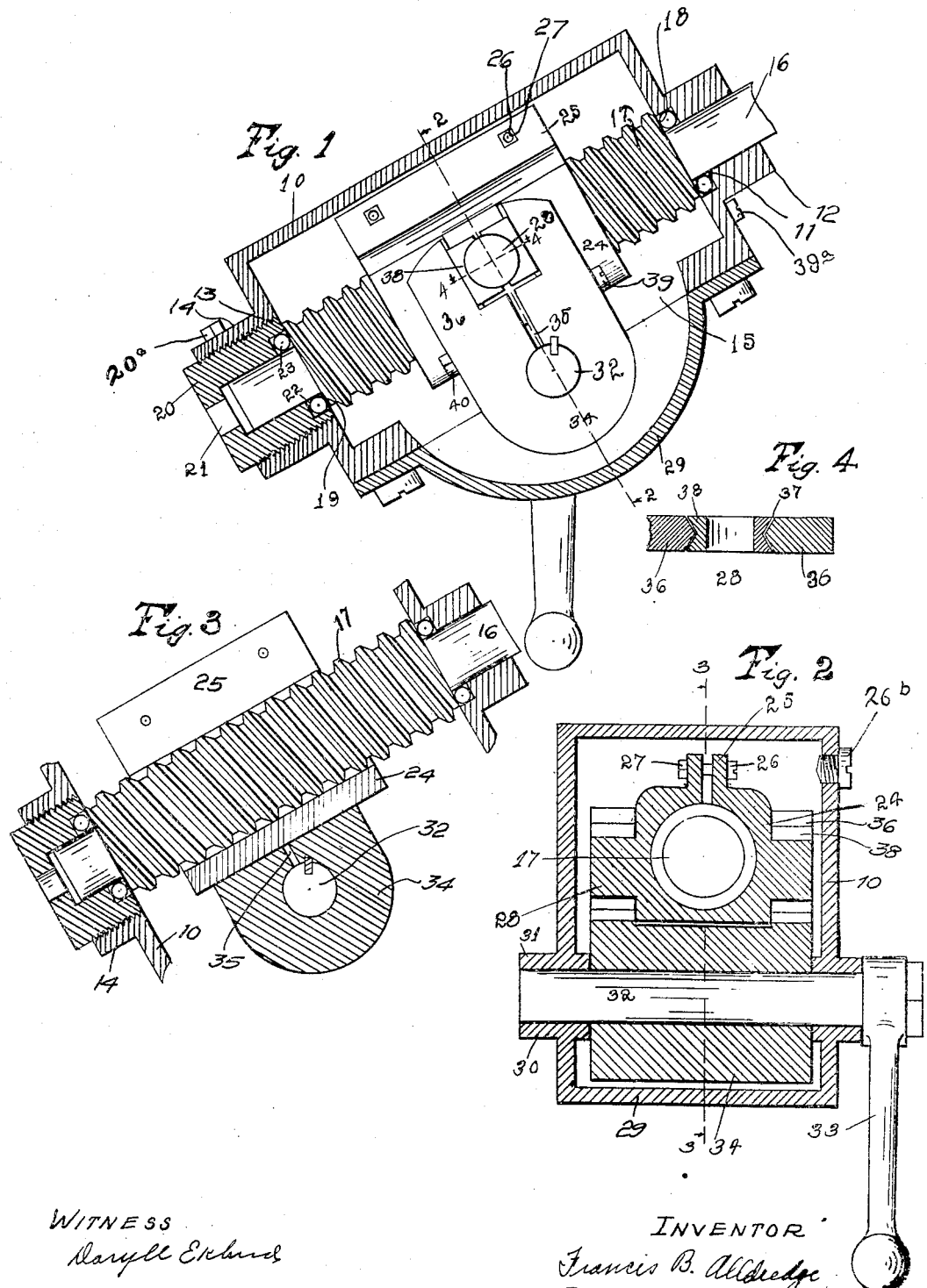

FRANCIS B. ALLDREDGE, OF DES MOINES, IOWA.

COMBINED WORM AND LEVER STEERING-GEAR DEVICE.

1,351,937.      Specification of Letters Patent.      Patented Sept. 7, 1920.

Application filed May 29, 1919. Serial No. 300,558.

*To all whom it may concern:*

Be it known that I, FRANCIS B. ALLDREDGE, a citizen of the United States, and a resident of Des Moines, in the county of Polk and State of Iowa, have invented a certain new and useful Combined Worm and Lever Steering-Gear Device, of which the following is a specification.

The object of my invention is to provide a steering gear device of simple and inexpensive construction employing the principle of the worm and also the principle of the lever in a structure so arranged as to reduce the wear of the parts to a minimum, and make it possible to take up the parts for making them work snugly and smoothly after some wear has taken place in the use of said parts.

My present device is an improvement on the devices set forth in my prior Patents Numbers 1,296,251 and 1,299,532, issued March 4, 1919, and April 8, 1919, respectively.

With these and other objects in view my invention consists in the construction, arrangement and combination of the various parts of the device whereby the objects contemplated are attained, as hereinafter more fully set forth, pointed out in my claims and illustrated in the accompanying drawings, in which:

Figure 1 shows a side elevation of a combined worm and lever steering gear device embodying my invention, the casing for the parts being shown in vertical cross section.

Fig. 2 shows a transverse, sectional view of the same taken on the line 2—2 of Fig. 1.

Fig. 3 shows a sectional view taken on the line 3—3 of Fig. 2; and

Fig. 4 shows a detail, sectional view taken on the line 4—4 of Fig. 1, and illustrating the arrangement of the slidable bearings.

There is provided for my improved device, in the form thereof illustrated in my drawings, a casing 10 having at one end an opening 11, extending away from which is an annular cylindrical flange 12 and having at the other end a larger opening 13, extending away from which is an annular cylindrical flange 14 internally screw-threaded.

The casing 10 also has in its lower side a large opening 15. When the casing and the parts therein are installed on the machine, the casing is in inclined position as illustrated in Fig. 1.

Received within the casing 10 is a steering shaft 16 which is inserted through the casing through the opening 13, and thence through the opening 11.

The shaft 16 has an enlarged portion within the casing provided with a worm 17 thereon, having the standard thread as shown.

It will be noted that at each end of the worm 17 is a reduced portion of the shaft 16, so that the shaft 16 is provided with a shoulder 18 adapted to engage the upper end of the casing 10, and with a shoulder 19 forming part of a ball race.

Screwed into the flange 14 is a plug cap 20 having in its lower end an opening 21 for the spark and fuel control rods.

The plug cap 21 has on its interior an annular rabbet 22 forming another portion of the ball race, and is adapted to hold the balls 23 in proper position with relation to the annular shoulder 19 on the lower end of the shaft 16.

Mounted on the worm 17 is an internally screw-threaded split nut 24 arranged to travel on the worm 17 and having at its upper edge adjacent to the split therein the corresponding flanges 25. Mounted in the flanges 25 are bolts 26 on which are nuts 27.

It will be seen that by adjusting the nuts 27 on the bolts 26, the nut 24 may be tightened on the worm for originally properly assembling the parts and for taking up subsequent wear.

The nut 25 is provided with opposite alined, laterally extending spindles 28.

The cover member 29 is provided for the opening 15 in the lower part of the casing 10.

Mounted in suitable bearings 30 and 31 formed on the cover member 29 and the casing 10, is a transverse shaft 32, having on one end the steering knuckle arm 33 outside the casing.

Fixed on the shaft 32 within the casing is a split sleeve 34. The sleeve 34 has a longitudinal slot 35 in its wall, which extends from end to end of the sleeve 34 transversely of the casing 10, which slot is arranged in the side of the sleeve 34 adjacent to the spindles 28.

On each side of the slot 35 and at each end of the sleeve 34 said sleeve is provided with a pair of spaced upwardly projecting arms 36. The arms of each pair extend to position on opposite sides of one of the spindles 28 and are spaced from each other longitudinally of the worm 17. The adjacent faces of each pair of arms form guideways 37 for a slidable two-part bearing 38, in which one of the spindles 28 is received.

For adjustably drawing the arms 36 of each pair toward each other, and for drawing the parts of the sleeve 34, on opposite sides of the slot 35, toward each other, I have provided adjustable bolts 39 extending through said last named portions, and having on their ends nuts 40.

The parts are so constructed that when they are originally assembled in a completed steering device, the flanges 25 will be spaced from each other slightly and the slot 35 will be held slightly open. It will be understood that there is sufficient resiliency of the parts to permit the adjustments herein referred to.

It will thus be obvious that on the original assembling of the device, the nut 24 may be mounted on the worm 17 with any desired snugness, and also that the bearings 38 may be held in the guideways 37 and against the spindles 28 with any desired snugness or tension.

In case of any wear on the shoulders 18 and 19 and the parts which engage said shoulders, it will be seen that by screwing the plug cap 20 inwardly, the ball bearings will be tightened, and the shoulders 18 may be moved against the flange 12 for taking up any play that may result from wear which has occurred by end thrust either upwardly or downwardly on the steering shaft 16.

Any play of the worm 17 with relation to the nut 24, which might occur as result of wear or loosening of the parts, may be taken up by tightening the nuts 27 on the bolts 26, and thereby drawing the nut 24 into snugger engagement with the worm 17.

It will be noted that inasmuch as the bolts 39 are located between the shaft 32 and the spindles 28, any play of the spindles 28 in the bearings 38, or of the bearings 38 with relation to the guide-ways 37, and also any play of the shaft 32 in the sleeve 34 may be taken up by tightening the nuts 40 on the bolts 39.

In this connection attention is called to the special advantage whereby the same means may be used for taking up play between spindles 28 and the bearings 38 and between the bearings 38 and the arms 36. The plug cap 20 may be locked in position by a set screw 20ᵃ.

For ready adjustment of the bolts 26, I have mounted in the wall of the casing 10 at a point opposite the middle point of the flanges of the nut 24 a removable plug 26ᵇ. It will be obvious that the opening for this plug may be used for putting oil into the casing, or may be used for the insertion of a screw-driver.

When the nut 24 is at one limit of its movement on the worm one of the bolts 26 will be accessible through said opening, and when the nut is at the other limit of its movement the other of said bolts 26 will be thus accessible.

For permitting access to the bolts 39 I have provided suitable plugs 39ᵃ in the wall of the casing 10. By removing the plugs 39ᵃ access with a screw-driver may be had to the respective bolts 39.

It will thus be seen that the bolts 26 and 39 may be adjusted without taking the device apart, and with a minimum of inconvenience, through the openings which may be used also for oiling purposes.

In the practical operation of my device, the rotation of the shaft 16 moves the nut 24 longitudinally on the worm 17, thereby moving the pins 28 and bearings 38 and imparting what may be called a swinging movement with a lever action to the sleeve 34 and shaft 32, for operating the steering arm 33.

The bearings 38 slide between the members of the respective pairs of arms 36.

The entire device may be run in oil, so that proper lubrication is easily had.

Some changes may be made in the construction and arrangement of the parts of my improved device without departing from the essential features and purposes of my invention, and it is my intention to cover by my claims any modified forms of structure or use of mechanical equivalents which may be reasonably included within their scope.

I claim as my invention:

1. In a device of the class described; a casing; a steering shaft mounted therein, having a worm formed thereon; a nut on said worm having opposite spindles; a shaft mounted in said casing; a sleeve on said shaft, having opposite pairs of arms extending to position adjacent to said spindles; two-part bearings for the respective spindles, mounted between the arms of each pair; and a steering arm on said second shaft.

2. In a device of the class described; a casing; a steering shaft mounted therein, having a worm formed thereon; a nut on said worm having opposite spindles; a shaft mounted in said casing, a sleeve on said shaft, having opposite pairs of arms extending to position adjacent to said spindles; two-part bearings for the respective spindles, mounted between the arms of each pair; a steering arm on said second shaft; said sleeve being split; and a take-up device connecting the opposite sides of said sleeve.

3. In a device of the class described; a casing; a steering shaft mounted therein, having a worm formed thereon; a nut on said worm having opposite spindles; a shaft mounted in said casing; a sleeve on said shaft, having opposite pairs of arms extending to position adjacent to said spindles; two-part bearings for the respective spindles, mounted between the arms of each pair; a steering arm on said second shaft; said nut being split; and a take-up device for gripping said nut on said worm.

4. In a device of the class described; a casing; a steering shaft mounted therein, having a worm thereon within said casing; a nut on said worm, a second shaft mounted in said casing; a split sleeve fixed on said shaft; pairs of arms on said sleeve; the members of each pair extending to position on opposite sides of said nut; spindles on said nut projecting between the members of the respective pairs of arms; two-part bearings on said spindles, slidably mounted between the members of the respective pairs of arms.

5. In a device of the class described; a casing; a steering shaft mounted therein, having a worm thereon within said casing; a nut on said worm; a second shaft mounted in said casing; a split sleeve fixed on said shaft; pairs of arms on said sleeve; the members of each pair extending to position on opposite sides of said nut; spindles on said nut projecting between the members of the respective pairs of arms; two-part bearings on said spindles, slidably mounted between the members of the respective pairs of arms; and means for taking up play between said arms and said bearings.

6. In a device of the class described; a casing; a steering shaft mounted therein, having a worm thereon within said casing; a nut on said worm; a second shaft mounted in said casing; a split sleeve fixed on said shaft; pairs of arms on said sleeve; the members of each pair extending to position on opposite sides of said nut; spindles on said nut projecting between the members of the respective pairs of arms; two-part bearings on said spindles, slidably mounted between the members of the respective pairs of arms; means for taking up play between said arms and said bearings, and for taking up play between said second shaft and said sleeve.

7. In a device of the class described; a casing; a steering shaft mounted therein, having a worm thereon within said casing; a nut on said worm; a second shaft mounted in said casing; a split sleeve on said second shaft, fixed with relation thereto, spindles on said nut; bearings for said spindles, arms on said sleeve on the opposite sides of the slit therein for supporting said bearings, and means for drawing the parts of said sleeve on opposite sides of the slit therein together.

8. In a device of the class described; a casing; a steering shaft mounted therein, having a worm thereon within said casing; a nut on said worm; a second shaft mounted in said casing; a split sleeve fixed on said second shaft; a spindle on said nut; a two-part bearing for said spindle, slidably supported by said sleeve; and means for drawing parts of the sleeve on opposite sides of the spindle toward each other.

Des Moines, Iowa, April 14, 1919.

FRANCIS B. ALLDREDGE.